(12) United States Patent
Chang

(10) Patent No.: US 7,737,056 B2
(45) Date of Patent: Jun. 15, 2010

(54) MOISTURE-WICKING AND FAST DRYING CLOTH

(76) Inventor: Shih-Chieh Chang, 3F., No. 70, Minsheng St., Lujhou City, Taipei Hsien (TW)

( * ) Notice: Subject to any disclaimer, the term of this patent is extended or adjusted under 35 U.S.C. 154(b) by 0 days.

(21) Appl. No.: 11/682,137

(22) Filed: Mar. 5, 2007

(65) Prior Publication Data

US 2008/0220673 A1    Sep. 11, 2008

(51) Int. Cl.
*D03D 9/00* (2006.01)
*B32B 5/26* (2006.01)

(52) U.S. Cl. ............................. 442/5; 442/32; 442/49

(58) Field of Classification Search ............... 442/5, 442/32, 49
See application file for complete search history.

(56) References Cited

U.S. PATENT DOCUMENTS 5,471,683 A * 12/1995 Moretz et al. .................. 2/181
5,735,145 A *  4/1998 Pernick ........................ 66/196
6,918,140 B1 *  7/2005 Cooper ......................... 2/228

* cited by examiner

*Primary Examiner*—Ula C Ruddock
(74) *Attorney, Agent, or Firm*—patenttm.us

(57) ABSTRACT

A moisture-wicking and fast drying cloth has an outer layer and an inner layer. The outer layer is made of hydrophilic synthetic fiber and has multiple meshes. The meshes are defined through the outer layer. The inner layer is made of hydrophobic synthetic fiber and is bonded to the outer layer. The inner layer exposed by the meshes pulls away from a person's skin and protrudes into the meshes when perspiration exceeds evaporating moisture from the outer layer, so area of the inner layer contacting the person's skin will be reduced to make the person comfortable.

3 Claims, 3 Drawing Sheets

MOISTURE-WICKING AND FAST DRYING CLOTH

BACKGROUND OF THE INVENTION

1. Field of Invention

The present invention relates to a moisture-wicking and fast drying cloth, and more particularly to cloth that reduces contact area with skin when perspiration from skin exceeds moisture evaporating from the cloth, so a person will feel comfortable.

2. Description of the Related Art

When a person perspires, cloth in clothing worn by the person gets wet and sticks to the person's skin, and the person will feel uncomfortable. Thus, many products sold are made of various types of cloth that are moisture-wicking and fast drying. Moisture evaporates from most conventional cloth based on temperature difference between the person's skin and the environment.

With reference to FIG. 4, a low-cost moisture-wicking cloth comprising an inner layer (40) and an outer layer (30). The inner layer (40) is made of a synthetic fiber with low weight denim and comes in contact with skin when people wear clothes made of the moisture-wicking cloth. "Weight denim" refers to how much a yard of a fabric weights. The weight denim is related to thickness of yarn used and wrap and weft counts. Higher weight denim implies heavier yarn weights and stronger fabric. The outer layer (30) is made of a synthetic fiber with high weight denim and is bonded to the inner layer (40).

When a person wears clothes made of the moisture-wicking cloth, the inner layer (40) will absorb perspiration. Then the perspiration absorbed by the inner layer (40) will be absorbed by the outer layer (30) based on a siphon interaction caused by difference of the weight denim between the inner layer (40) and the outer layer (30). Finally, the perspiration will evaporate to the environment based on temperature difference between the person's skin and the environment. Therefore, the clothes will dry and make people comfortable.

However, when perspiration exceeds moisture evaporating from the cloth, the moisture in the inner layer (40) cannot be absorbed by the outer layer (30) quickly enough. Thus, the wet inner layer (40) contacts the person's skin and makes the person uncomfortable.

To overcome the shortcomings, the present invention provides a moisture-wicking and fast drying cloth to mitigate or obviate the aforementioned problems.

SUMMARY OF THE INVENTION

The primary objective of the present invention is to provide cloth that reduces area in contact skin when perspiration exceeds moisture evaporating from the cloth, so a person will feel comfortable.

To achieve the objective, the moisture-wicking and fast drying cloth in accordance with the present invention comprises an outer layer and an inner layer. The outer layer is made of hydrophilic synthetic fiber and has multiple meshes. The meshes are defined through the outer layer. The inner layer is made of hydrophobic synthetic fiber and is bonded to the outer layer. The inner layer exposed by the meshes pulls away from a person's skin and protrudes into the meshes when perspiration from a person's skin exceeds moisture evaporating from the outer layer, so area of the inner layer contacting the person's skin will be reduced to make the person comfortable.

Other objectives, advantages and novel features of the invention will become more apparent from the following detailed description when taken in conjunction with the accompanying drawings.

DETAILED DESCRIPTION OF THE INVENTION

Figure 1:
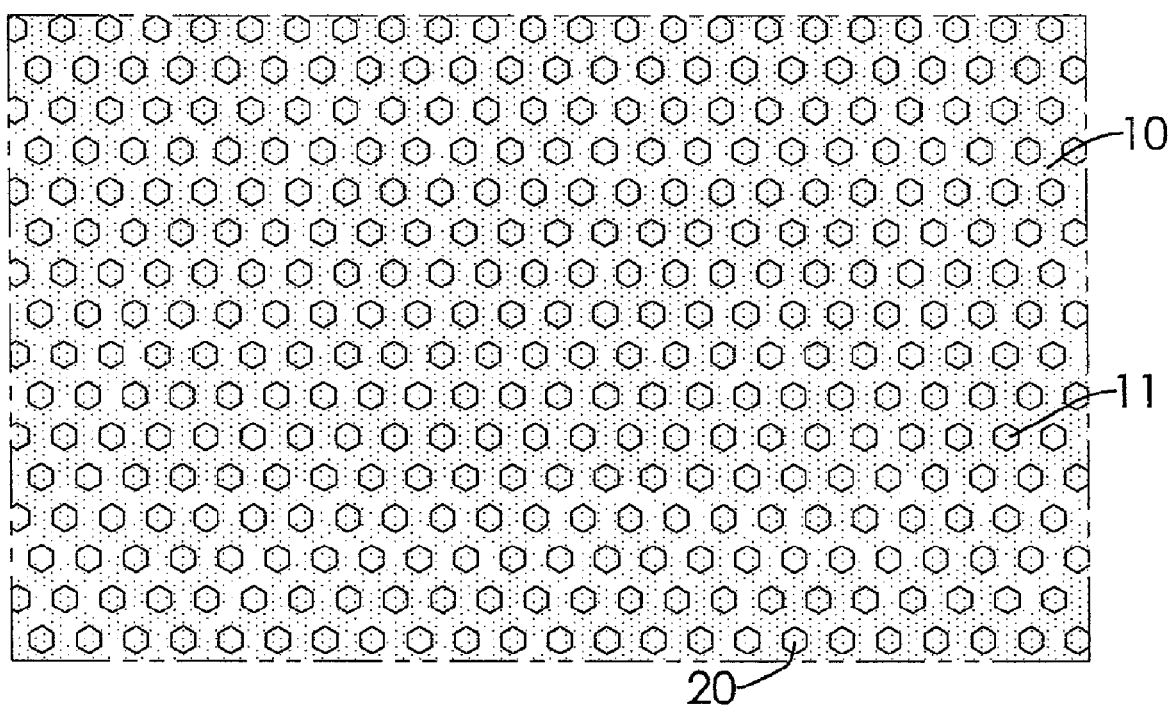
FIG. 1 is a top view of a moisture-wicking and fast drying cloth in accordance with the present invention.
Figure 2:
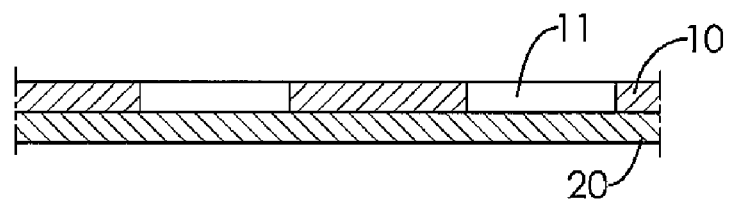
FIG. 2 is an enlarged cross sectional side view of the moisture-wicking and fast drying cloth in FIG. 1.

With reference to FIGS. 1 and 2, a moisture-wicking and fast drying cloth in accordance with the present invention comprises an outer layer (10) and an inner layer (20).

The outer layer (10) is made of hydrophilic synthetic fiber and has multiple meshes (11). The hydrophilic synthetic fiber can be rayon. The meshes (11) are defined through the outer layer (10) in various densities and have various shapes and dimensions depending on different desired cloth.

Figure 3:
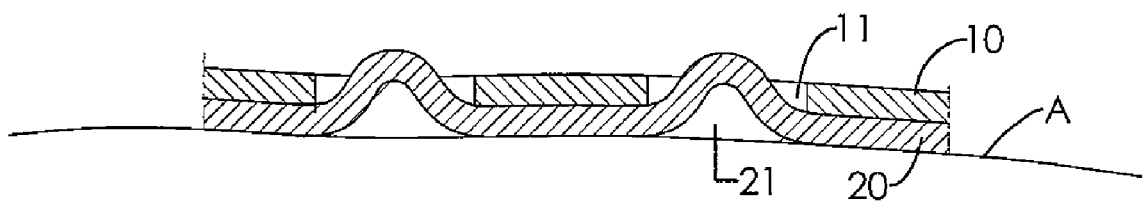
FIG. 3 is an operational cross sectional side view of the moisture-wicking and fast drying cloth in FIG. 1 with some parts of an inner layer protruding into meshes of an outer layer.
Figure 4:
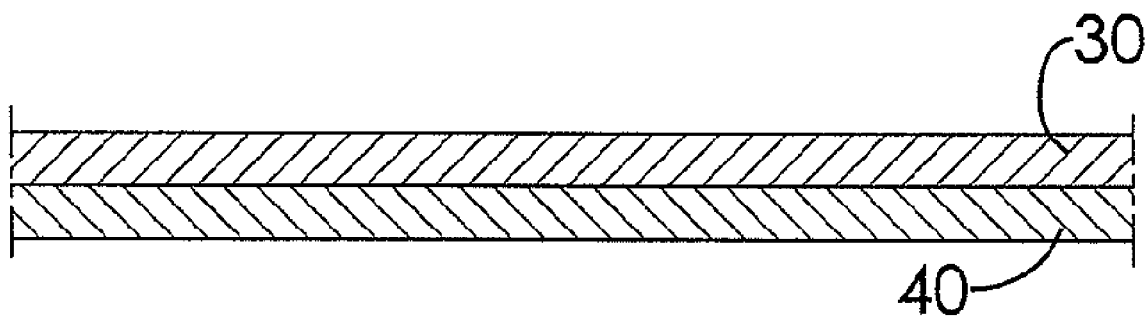
FIG. 4 is a cross sectional side view of a conventional moisture-wicking and fast drying cloth in accordance with the prior art.

With further reference to FIG. 3, the inner layer (20) is made of hydrophobic synthetic fiber, is bonded to and contacts the outer layer (10), comes in contact with a person's skin (A), absorbs perspiration, and transfers perspiration to the outer layer (10), and the inner layer (20) is exposed by the meshes (11) in the outer layer (10) and the inner layer (20) protrudes into the meshes (11) when perspiration exceeds moisture evaporating from the outer layer (10). The hydrophobic synthetic fiber can be polyester. The perspiration is transferred from the inner layer (20) to the outer layer (10) due to a siphon interaction caused by different hydrophilic characteristics between the inner layer (20) and the outer layer (10). The inner layer (20) exposed by the meshes (11) is pulled into the meshes (11) by expansion of the outer layer (10) as it fills with moisture and pulls away from a person's skin (A) so area of the inner layer (20) contacting the person's skin (A) will be reduced to make the person comfortable.

In detail, the inner layer (20) has an inward side and an outward side. The inward side faces the person's skin (A). The outward side is bonded to and contacts with the outer layer (10). When the outer layer (10) expands, the inner layer (20) exposes the outward side by the meshes (30) in the outer layer (10) and inner layer (20) protrudes into the meshes (11) in a direction toward the outward side to allow the inward side to form multiple concaves (21) (FIG. 3). Therefore, the inner layer (20) presents a waved shape. Therefore, the concaves (21) allow the inner layer (20) to be partially detached from the person's skin (A), so a wet cloth does not adhere thoroughly on the person's skin (A).

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A moisture-wicking and fast drying cloth comprising:

an outer layer being made of hydrophilic synthetic fiber and having multiple meshes defined through the outer layer; and an inner layer being made of hydrophobic synthetic fiber and having an inward side; and an outward side being bonded to and contacting with the outer layer, and the inner layer exposing the outward side by the meshes in the outer layer and the inner layer protruding into the meshes in a direction toward the outward side to allow the inward side to form multiple concaves allowing the inner layer to form a waved shape when the outer layer expands.

2. The moisture-wicking and fast drying cloth as claimed in claim 1, wherein the hydrophilic synthetic fiber is rayon.

3. The moisture-wicking and fast drying cloth as claimed in claim 1, wherein the hydrophobic synthetic fiber is polyester.

* * * * *